United States Patent
Akasaka

[19]

[11] Patent Number: 5,854,871
[45] Date of Patent: Dec. 29, 1998

[54] DISPENSION SHIFT OPTICAL FIBER AND WAVELENGTH DIVISION MULTIPLEX TRANSMISSION SYSTEM USING THE SAME

[76] Inventor: Youichi Akasaka, 133 .G.F. Furukawa, 4.Totsumidaihigado 3 chome, Ichihara-shi, Chiba, Japan

[21] Appl. No.: 826,220

[22] Filed: Mar. 27, 1997

[30] Foreign Application Priority Data

Mar. 28, 1996 [JP] Japan .................................. 8-099373

[51] Int. Cl.⁶ .............................. G02B 6/02; G02B 6/16; H04B 10/12
[52] U.S. Cl. ......................... 385/123; 385/126; 359/161; 359/173; 359/341
[58] Field of Search .................................. 385/122–124, 385/126, 28; 359/161, 173, 341, 130, 181, 182; 372/6

[56] References Cited

U.S. PATENT DOCUMENTS

| | | | |
|---|---|---|---|
| 5,343,322 | 8/1994 | Pirio et al. .................. | 385/28 |
| 5,448,674 | 9/1995 | Vengsarkar et al. ...................... | 385/123 |
| 5,559,910 | 9/1996 | Taga et al. .................. | 385/24 |
| 5,559,920 | 9/1996 | Chraplyvy et al. ...................... | 385/123 |
| 5,649,044 | 7/1997 | Bhagavatula ............................ | 385/123 |
| 5,764,841 | 6/1998 | Iwatsuki et al. ......................... | 385/123 |

FOREIGN PATENT DOCUMENTS 7-336301  12/1995  Japan .

*Primary Examiner*—Hemang Sanghavi
*Attorney, Agent, or Firm*—Robert G. Lev

[57] ABSTRACT

The invention provides a dispersion shift optical fiber which is capable of a zero dispersion wavelength division multiplex optical transmission in the wavelength band of 1550 nm and a wavelength division multiplex transmission using the optical fiber. With the dispersion shift optical fiber according to the invention, the relationship between the relative refractive index difference $\Delta\_1$ of a core of an optical fiber, the relative refractive index difference $\Delta\_2$ of the first clad covering the core, and the relative refractive index difference $\Delta 3$ of the second clad covering the outer circumferential side thereof is $\Delta 1 > \Delta 3 > \Delta 2$, the mean dispersion slope of the use wavelength band of a wavelength from 1530 nm to 1560 nm is made a negative value, and the zero dispersion wavelength is set to a value which is outside the gain band of an erbium-doped fiber amplifier. A wavelength division multiplex transmission system according to the invention is constructed by connecting the above-mentioned dispersion shift optical fiber to a positive dispersion slope optical fiber which has a positive dispersion slope in the wavelength range from 1530 nm to 1560 nm and has almost the same zero dispersion wavelength, whereby the dispersion slope of the positive dispersion slope optical fiber is counterbalanced and compensated and the dispersion around a wavelength from 1530 nm to 1560 nm is made almost zero.

9 Claims, 3 Drawing Sheets

DISPENSION SHIFT OPTICAL FIBER AND WAVELENGTH DIVISION MULTIPLEX TRANSMISSION SYSTEM USING THE SAME

FIELD OF THE INVENTION

The present invention relates generally to the use of a dispersion shift optical fiber with a positive dispersion slope optical fiber and in a particular aspect, to a wavelength division multiplex transmission system having an optical amplifier in which an erbium-doped optical fiber excited by, for example, an excitation optical source, is used.

BACKGROUND OF THE INVENTION

Recently, since an optical amplifier in which an erbium-doped optical fiber is used (hereinafter called "EDFA" (Erbium-doped fiber amplifier)) was realized, it became possible to directly amplify optical signals, the wavelength of which is in the range of 1.55 $\mu$m (1550 nm) without converting them to electrical signals, whereby large-capacity and long-distance communications have been achieved in the field of optical communications. Furthermore, on the other hand, in order to increase the communication capacity in the optical communications, a wavelength division multiplex (hereinafter called "WDM") system by which optical signals having different wavelengths can be transmitted by a single optical fiber, is utilized for communications. By applying an optical amplifier, in which the above-mentioned erbium-doped optical fiber is used, to an optical communication system where this wavelength division multiplex system is used, it is expected that the communication capacity will be further increased and a long-distance transmission will be realized by the wavelength division multiplex system.

A dispersion shift optical fiber having zero dispersion in the range of wavelengths of 1550 nm has been proposed for use with a wavelength division multiplex system using the above-mentioned EDFA. However, a dispersion shift optical fiber has zero dispersion at wavelengths roughly between 1530 nm to 1560 nm, which is the gain band of the above-mentioned EDFA; unfortunately, four-wave mixing (FWM) occurs. FWM is a non-linear phenomenon that arises when light of a plurality of wavelengths is launched into this optical fiber. Consequently, the signal light power is diminished by this four-wave mixing, as the signals are converted to signals of the other wavelengths thereby becoming noise; hence, a problem arises in the optical transmission. Furthermore, the above-mentioned conventional dispersion shift optical fiber has a positive dispersion slope where the dispersion value thereof becomes, large corresponding to an increase of the wavelength, and the value thereof generally is 0.07 ps/nm$^2$/km.

In order to lessen the problems due to FWM the use of an optical fiber in which the dispersion value in the use wavelength of interest is made apart from zero and the dispersion at the use wavelength becomes ±1.5 to 4 ps/nm/km or the like is employed. This kind of optical fiber is disclosed in Japanese Patent Application Publication No. 168046 of 1995, and the trademark of the optical fiber is filed and registered as "TRUE WAVE" by AT & T Corporation. "TRUE WAVE" optical fiber has zero dispersion around the wavelength of 1520 nm. At or about the wavelength of 1580 nm it has a positive dispersion slope. Furthermore, optical fibers having a positive dispersion slope such as "TRUE WAVE" and conventional general dispersion shift optical fibers are hereinafter called "positive dispersion slope optical fibers".

However, since the positive dispersion slope "TRUE WAVE" optical fiber does not employ zero dispersion at the use band as described above, dispersion due to the positive dispersion slope optical fiber itself arises in the use wavelength band. Therefore, in a case where a positive dispersion slope optical fiber such as "TRUE WAVE" is used, the following method was adopted. By way of example, TRUE WAVE positive dispersion slope optical fiber, which is equipped with chromatic dispersion characteristics at the characteristic line b1 in FIG. 5, is used as an optical transmission line, and the TRUE WAVE optical fiber, which is equipped with chromatic dispersion characteristics shown at the characteristic line b2 in the same drawing is connected to the line as a dispersion compensation type optical fiber module so that the chromatic dispersion characteristics shown at the characteristic line b3 in the same drawing can be obtained as the chromatic dispersion characteristics of an optical transmission line, whereby the dispersion becomes zero at the center wavelength (for example, 1550 nm) of the use wavelength.

In another way, equal lengths of a positive dispersion slope optical fiber (i.e. TRUE WAVE) having the wavelength characteristics b1 and a positive dispersion slope optical fiber of TRUE WAVE having the wavelength characteristics b2 are alternately connected to comprise an optical transmission line, thereby as a whole obtaining a chromatic dispersion characteristic shown at the characteristic line b4 in the same drawing, whereby the dispersion at the center wavelength (for example 1550 nm) of the use wavelength becomes zero.

OBJECT AND SUMMARY OF THE INVENTION

However, if such an embodiment is employed, although the dispersion at the center wavelength certainly becomes zero, residual dispersion of −1.6 ps/nm/km arises at the wavelength of 1530 nm, for example, at the characteristic line b4 (with the characteristic line b3, the residual dispersion becomes greater), and dispersion of 128 ps/nm will remain in a case where the relay interval (transmission range) is 80 km. In such a case, the signal light may be distorted to cause the bit error rate at the center wave to differ from that at the end waves, whereby the reliability of wavelength division multiplex transmission is remarkably lowered.

In order to solve the above-mentioned problems, the invention was developed, and it is therefore an object of the invention to provide a dispersion shift optical fiber which is capable of zero dispersion wavelength division multiplex transmission around the wavelength of 1550 nm by applying the same to a wavelength division multiplex system having an optical amplifier in which, for example, erbium-doped fiber is used, and to provide a wavelength division multiplex transmission system using the optical fiber.

In order to achieve the above-mentioned object, the invention is constructed as described below to solve the object. The first invention proposes a dispersion shift optical fiber which is connected to and is used with a positive dispersion slope optical fiber which has a positive dispersion slope and a zero dispersion wavelength band of 1500 nm to 1600 nm, and which is constructed so that the mean dispersion slope in the range of the wavelength of 1530 nn to 1560 nm is negative and the chromatic dispersion of a wavelength which is roughly coincident with the zero dispersion wavelength of the above-mentioned positive dispersion slope optical fiber is roughly 0 ps/nm/km, whereby the object and theme of the invention are solved.

Furthermore, in an alternative embodiment, which is provided with the construction set forth in the first embodiment, is constructed so that the zero dispersion wavelength of the positive dispersion slope optical fiber is a wavelength value which is outside the wavelength band from 1530 nm to 1560 nm and the zero dispersion wavelength of the dispersion shift optical fiber is made roughly coincident with the zero dispersion wavelength of the above-mentioned positive dispersion slope optical fiber, whereby the object and theme of the invention are solved.

Furthermore, the third embodiment, which is provided with the construction set forth in the first embodiment, is constructed so that the mean dispersion slope in the wavelength range from 1530 nm to 1560 nm is made smaller than −0.07 ps/nm$^2$/km, whereby the object and theme of the invention are solved.

Still furthermore, the fourth embodiment, which is provided with the construction set forth in the first, second or third embodiment, is constructed so that where the relative refractive index difference of a core is Δ1, the relative refractive index difference of the first clad covering the outer circumferential side of said core is Δ2, and the relative refractive index difference of the second clad covering the outer circumferential side of said first clad is Δ3, an inequality Δ1>Δ3>Δ2 is established.

Still furthermore, the fifth embodiment proposes a wavelength division multiplex transmission system which is capable of wavelength division multiplex optical transmissions by passing optical signals amplified by an optical amplifier, in which an erbium-doped optical fiber is used, through an optical line to which a positive dispersion slope optical fiber and dispersion shift optical fiber are connected, and which is constructed so that the above-mentioned amplifier has a gain band roughly between 1530 nm and 1560 nm, the positive dispersion slope optical fiber has a positive dispersion slope, the zero dispersion wavelength band is from 1500 nm to 1600 nm, the dispersion shift optical fiber has a negative mean dispersion slope, the wavelength of which is from 1530 nm to 1560 nm, and the zero dispersion wavelength of which is made roughly coincident with the zero dispersion wavelength of the above-mentioned positive dispersion slope optical fiber, and the zero dispersion wavelength of the above-mentioned positive dispersion slope optical fiber and dispersion shift optical fiber is set to the wavelengths which are outside the gain band of the above-mentioned amplifier, whereby the object and theme of the invention are solved.

With a dispersion shift optical fiber according to the invention, since the mean dispersion slope in the range from 1530 nm to 1560 nm, which is the gain band of an optical amplifier in which an erbium-doped fiber is used, is negative, the chromatic dispersion of a wavelength which is roughly coincident with the zero dispersion wavelength (the zero dispersion wavelength band of a positive dispersion slope optical fiber at the side to which the dispersion shift optical fiber is connected is from 1500 nm to 1560 nm) of a positive dispersion slope optical fiber to be connected is made roughly 0 ps/nm/km, the positive dispersion slope and negative dispersion slope are counterbalanced at least in the wavelength band from 1530 nm to 1560 nm by connecting the dispersion shift optical fiber according to the invention to the positive dispersion slope optical fiber having a positive dispersion slope, whereby the counterbalancing compensation of the dispersion amount is effectively carried out.

Therefore, by constructing a wavelength division multiplex transmission system, in which the EDFA is used, with a dispersion shift optical fiber of the invention connected to a dispersion shift optical fiber having a positive dispersion slope, the dispersion slope can be made a value almost equal to zero, whereby the dispersion amount of optical signals can be made a value almost equal to zero, Resultantly, it is possible to clearly separate signals of the respective wavelengths at the receiving side, and a high-density, high-speed and large-capacity wavelength division multiplex communication having a high reliability is able to be obtained.

Especially, in a case where the zero dispersion wavelength of a dispersion shift optical fiber of the invention and a positive dispersion slope optical fiber at the connected side is set to a wavelength of around 1520 nm to 1580 nm which is outside the gain band of the above-mentioned amplifier (EDFA), a positive dispersion slope optical fiber is formed of an optical fiber called TRUE WAVE, which has a dispersion of ±1.5 to 4 ps/nm/km, and a wavelength division multiplex transmission system is constructed, as shown above, by connecting an optical fiber called "TRUE WAVE" and the dispersion shift optical fiber of the invention together, it is possible to substantially prevent the four-wave mixing, which is one of the non-linear phenomena, from occurrence, thereby further improving the reliability of optical communication systems.

Furthermore, with a dispersion shift optical fiber according to the invention, in which the mean dispersion slope in the wavelength range from 1530 nm to 1560 nm is made smaller than −0.07 ps/nm$^2$/km and the absolute value of the negative mean dispersion slope is made larger, since the positive dispersion slope of a positive dispersion slope optical fiber generally is 0.07 ps/nm$^2$/km, the length of a dispersion shift optical fiber according to the invention is made short by connecting a dispersion shift optical fiber of the invention to the above-mentioned positive dispersion slope optical fiber, thereby it is possible to carry out a counterbalance compensation of the dispersion slope of a positive dispersion slope optical fiber. Therefore, since the counterbalance compensation of the dispersion slope of a positive dispersion slope optical fiber can be more effectively carried out, it is possible to construct a highly reliable wavelength division multiplex transmission system.

Still furthermore, with a dispersion shift optical fiber according to the invention, since the refractive index profile of the dispersion shift optical fiber is made a W-shaped refractive index profile structure in which an inequality Δ_1>Δ3>Δ2 is established, where the relative refractive index difference of a core is Δ1, the relative refractive index difference of the first clad covering the outer circumferential side of said core is Δ_2, and the relative refractive index difference of the second clad covering the outer circumferential side of said first clad is Δ_3, it is possible to easily form an optical fiber in which a mean dispersion slope in the wavelength range from 1530 nm to 1560 nm becomes negative.

BRIEF DESCRIPTION OF THE DRAWINGS

These and other objects and advantages of the present invention will become more apparent and more readily appreciated from the following detailed description of the exemplary embodiments of the invention, taken in conjunction with accompanying drawings, in which.

DETAILED DESCRIPTION

Figure 1:
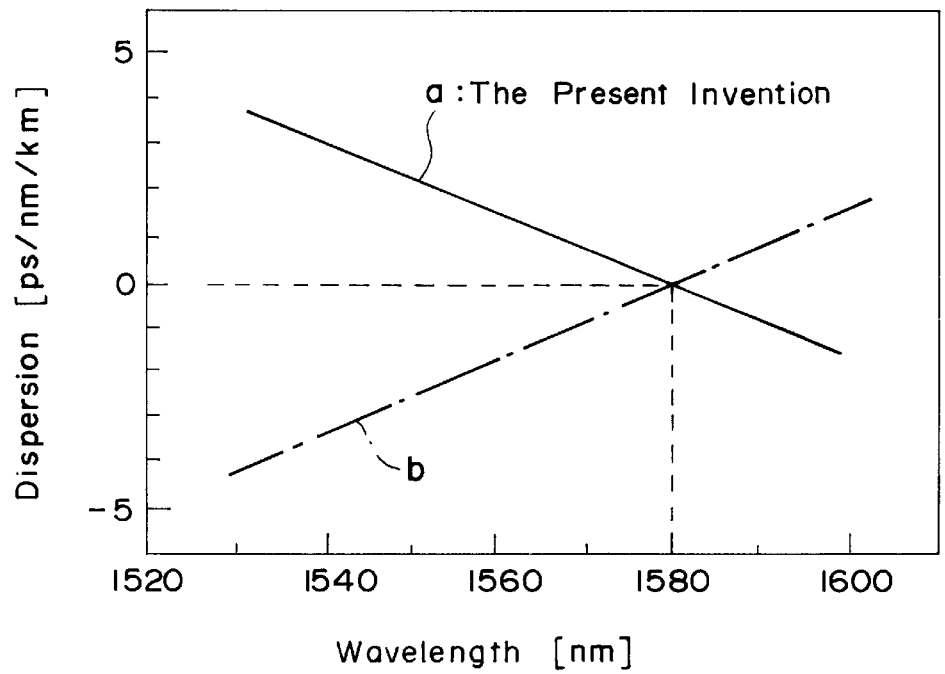
FIG. 1 is a graph showing the chromatic dispersion characteristics of a preferred embodiment of a dispersion shift optical fiber according to the invention along with the chromatic dispersion characteristics of a positive dispersion slope optical fiber at the connected side.
Figure 2:
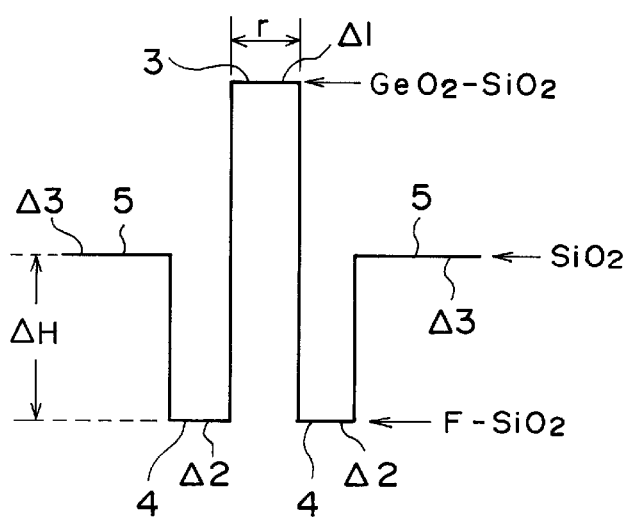
FIG. 2 is an explanatory view showing the refractive index profile structure of a dispersion shift optical fiber according to the preferred embodiment.
Figure 3:
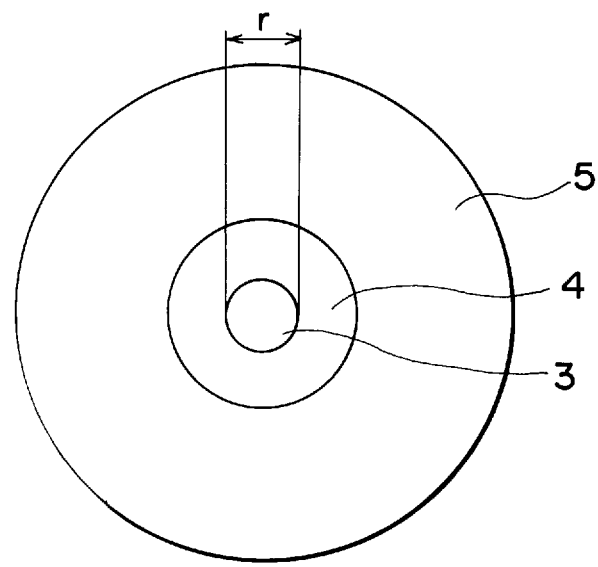
FIG. 3 is a cross-sectional view of a dispersion shift optical fiber according to the abovementioned preferred embodiment.

Hereinafter, a preferred embodiment of the invention is described with reference to the drawings attached herewith. FIG. 1 shows the chromatic dispersion characteristics of a preferred embodiment of a dispersion shift optical fiber according to the invention. FIG. 2 shows the refractive index profile characteristics of the dispersion shift optical fiber, and FIG. 3 shows a cross-section view of the dispersion shift optical fiber. As shown in FIG. 2 and FIG. 3, a dispersion shift optical fiber according to the preferred embodiment has a core 3, a first clad 4 covering the outer circumferential side of the core 3, and a second clad 5 covering the outer circumferential side of the first clad 4. The dispersion shift optical fiber presents a W-shaped refractive profile wherein $\Delta 1 > \Delta\_3 > \Delta 2$ is established where the relative refractive index difference of the core 3 is $\Delta 1$, the relative refractive index difference of the first clad 4 is $\Delta 2$, and the relative refractive index difference of the second clad 5 is $\Delta 3$.

The inner diameter r of the core 3 is, for example, 4 $\mu$m, and the core 3 is formed of GeO—SiO$_2$ in which GeO$_2$ is doped, the first clad 4 is, for example, formed of F—SiO$_2$ in which fluorine F is doped, and the second clad is formed of, for example, SiO$_2$.

As shown with the characteristic line a in FIG. 2, a dispersion shift optical fiber according to the above-mentioned preferred embodiment has a dispersion value of 1.5 to 4 ps/nm/km in the wavelength range from 1530 nm to 1560 nm, and the mean dispersion slope at this wavelength area is negative, and the slope value thereof is –0.08 ps/nm$^2$/km. Furthermore, a dispersion shift optical fiber according to the invention is connected to a positive dispersion slope optical fiber called "TRUE WAVE", which is equipped with a chromatic dispersion characteristic shown by the characteristic line b in the same drawing, and is used for a wavelength division multiplex transmission using light of a wavelength band of 1550 nm. The absolute value of the above-mentioned mean dispersion slope of a dispersion shift optical fiber according to the invention, that is, a value of 0.08 ps/nm$^2$/km is almost equal to the value of a positive dispersion slope (about 0.08 ps/nm$^2$/km) of "TRUE WAVE" of the characteristic line b in FIG. 1.

Furthermore, a dispersion shift optical fiber according to the invention is formed so that the chromatic dispersion becomes roughly 0 ps/nm/km at a wavelength almost coincident with 1580 nm which is the zero dispersion wavelength of the positive dispersion slope optical fiber "TRUE WAVE" at the connected side, which has a characteristic of the characteristic line b in FIG. 1. In other words, the zero dispersion wavelengths of the dispersion shift optical fiber according to the above-mentioned preferred embodiment and the positive dispersion slope optical fiber at the connected side are 1580 nm and are formed to be equal to each other. Furthermore, as shown in FIG. 2, when forming a dispersion shift optical fiber having a W-shaped refractive index profile, if the difference ($\Delta\_H$ in FIG. 2) between the relative refractive index difference $\Delta 3$ of the second clad 5 and the relative refractive index difference $\Delta 2$ of the first clad 4 is made a large value, for example, –0.45%, it is possible to easily form a dispersion shift optical fiber in which the mean dispersion slope becomes negative in the wavelength range from 1530 nm to 1560 nm.

Figure 4:
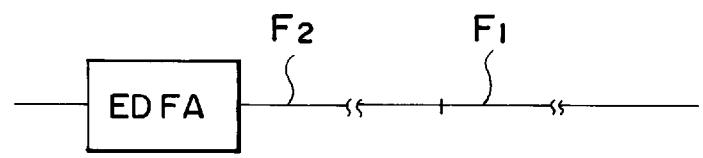
FIG. 4 is an explanatory view showing one example of a wavelength division multiplex transmission system according to the invention.
Figure 5:
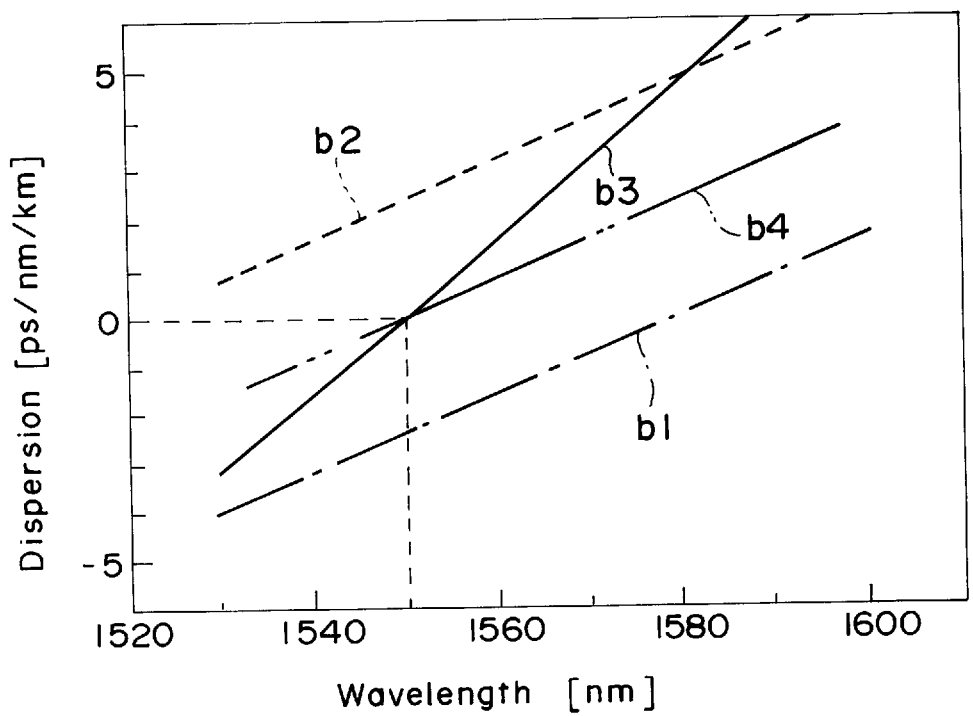
FIG. 5 is a graph showing the chromatic dispersion characteristics of an optical fiber called "TRUE WAVE" which is one of the examples of conventionally proposed positive dispersion slope optical fibers.

Moreover, as shown in FIG. 4, a wavelength division multiplex transmission system which is constructed by a line to which a dispersion shift optical fiber $F_1$ according to the preferred embodiment and a positive dispersion slope optical fiber $F_2$ are connected, wherein optical signals are amplified by an optical amplifier EDFA using an optical fiber to which erbium is doped, and the optical signals thereby amplified are transmitted through a line consisting of optical fibers $F_1$ and $F_2$.

The above-mentioned preferred embodiment is constructed as described above, and the same embodiment is formed so that the mean dispersion slope is negative in the wavelength range from 1530 nm to 1560 nm, the absolute value of this negative dispersion slope is equal to the absolute value of the positive dispersion slope of the positive dispersion slope optical fiber (TRUE WAVE) and the zero dispersion wavelength of a dispersion shift optical fiber according to the preferred embodiment is made roughly coincident with the zero dispersion wavelength of the positive dispersion slope optical fiber at the connected side. Therefore, by connecting the dispersion shift optical fiber of the preferred embodiment having a chromatic dispersion characteristic shown at the characteristic line a in FIG. 1 at the same distance (length) as the length of the positive dispersion slope optical fiber shown at the characteristic line b in the same drawing, the dispersion in the wavelength range from 1530 nm to 1600 nm, which includes a wavelength from 1530 nm to 1560 nm is caused to become zero.

Furthermore, the zero dispersion wavelength of a dispersion shift optical fiber according to the invention is 1580 nm and does not have a zero dispersion wavelength in the wavelength band from 1530 nm to 1560 nm which is the gain band of an optical amplifier (EDFA) having an erbium doped fiber, and further the dispersion in the wavelength range of 1530 nm to 1560 nm is 1.5 to 4 ps/nm/km or so. Therefore, when signal light in the wavelength range of 1550 nm band (about 1530 nm to 1560 nm) is caused to enter the dispersion shift optical fiber, almost no four-wave mixing (FWM) occurs. Furthermore, as described above, generation of the FWM is suppressed in an optical fiber called "TRUE WAVE".

For this reason, if a wavelength division multiplex transmission system is constructed so as to be equipped with the EDFA at the wavelength band of 1550 nm by connecting a dispersion shift optical fiber according to the invention and an optical fiber of TRUE WAVE being a positive dispersion slope optical fiber at the connected side together, it is possible to construct an optical communication system in which no FWM arises and the chromatic dispersion becomes almost zero throughout the entire use wavelength band, and furthermore it is possible to construct a high-speed and large-capacity optical communication system of remarkably high reliability.

Still furthermore, the invention is not limited to the above-mentioned preferred embodiment, and various modifications and variations are possible. For example, in the above-mentioned preferred embodiment, although the mean dispersion slope in the wavelength range from 1530 nm to 1560 nm is −0.08 ps/nm$^2$/km, the value of the mean dispersion slope is not specially limited as far as the mean dispersion slope is negative in the range from 1530 nm to 1560 nm. Furthermore, in the above-mentioned preferred embodiment, although the zero dispersion wavelength of a dispersion shift optical fiber is defined to be 1580 nm, the zero dispersion wavelength may be adequately set so as to be roughly coincident with the zero dispersion wavelength (a wavelength band from 1500 nm to 1600 nm, and any wavelength which is outside the gain band of an optical amplifier EDFA) of a positive dispersion slope optical fiber at the side to which the dispersion shift optical fiber is connected.

For example, the zero dispersion wavelength of a dispersion shift optical fiber may be 1585 nm and the mean dispersion slope may be −0.1 ps/nm$^2$/km in the wavelength from 1530 nm to 1560 nm of the dispersion shift optical fiber. The present applicant prepared this dispersion shift optical fiber and connected the same in the same length as that of an optical fiber called "TRUE WAVE" which has a zero dispersion wavelength in the wavelength of 1585 nm and has a dispersion slope of 0.1 ps/nm$^2$/km in the wavelength range from 1530 nm to 1560 nm, wherein the dispersion from 1530 nm to 1560 nm could almost simultaneously be made a zero dispersion (within ±0.03 ps/nm/km). Furthermore, only an optical fiber of "TRUE WAVE" has a dispersion of −5.5 ps/nm/km at a wavelength of 1530 nm and −2.5 ps/nm/km at a wavelength of 1560 nm.

Furthermore, it is possible to set the mean dispersion slope to a small value, for example, −0.1 ps/nm$^2$/km (the absolute value is small) in the wavelength from 1530 nm to 1560 nm when forming a dispersion shift optical fiber. However, if it is attempted to carry out the counterbalance compensation of an optical fiber called "TRUE WAVE" by connecting the dispersion shift optical fiber (the zero dispersion wavelength of which is 1585 nm) to the optical fiber called "TRUE WAVE", which has the zero dispersion wavelength of 1585 nm and has a mean dispersion slope of +0.1 ps/nm$^2$/km in the wavelength range from 1530 nm to 1560 nm, it is necessary to prepare a dispersion shift optical fiber which is ten times longer than the optical fiber called "TRUE WAVE".

For this reason, the larger the absolute value of the mean dispersion slope of a dispersion shift optical fiber becomes, the better it is. For example, since the positive dispersion slope of a conventionally proposed general positive dispersion slope optical fiber is about 0.07 ps/nm$^2$/km, it is preferable that the mean dispersion slope of a dispersion shift optical fiber of the invention in the wavelength range from 1530 nm to 1560 nm is made smaller than −0.07 ps/nm$^2$/km (that is, the negative absolute value is made larger than 0.07).

Still furthermore, with the above-mentioned preferred embodiment, although the refractive index profile structure of a dispersion shift optical fiber is made a W-shaped refractive index profile structure as shown in FIG. 2, the refractive index profile structure of a dispersion shift optical fiber is not specially limited, but the same may be adequately defined. However, by forming the refractive index profile structure of a dispersion shift optical fiber to be a W-shaped refractive index profile structure as in the above-mentioned preferred embodiment, it is possible to easily form a dispersion shift optical fiber in which the mean dispersion slope becomes negative in the wavelength range from 1530 nm to 1560 nm.

Furthermore, with the above-mentioned preferred embodiment, a description was given of an example in which a dispersion shift optical fiber is applied to a wavelength division multiplex transmission system by connecting the same to an optical fiber called "TRUE WAVE" being an example of a positive dispersion slope optical fiber. However, a dispersion shift optical fiber according to the invention may be connected to a positive dispersion slope optical fiber, the zero dispersion wavelength band is from 1500 nm to 1600 nm, other than an optical fiber called "TRUE WAVE". Even though the positive dispersion slope optical fiber is any of optical fibers other than "TRUE WAVE", it is possible to cause the dispersion in the wavelength range from 1530 nm to 1560 nm to approach zero dispersion in the entire wavelength band by connecting the positive dispersion slope optical fiber and a dispersion shift optical fiber of the invention together and thereby constructing a wavelength division transmission system. Therefore, the effects almost similar to those of the above-mentioned preferred embodiment can be obtained.

However, since generation of the four-wave mixing can be suppressed by constructing a wavelength division multiplex transmission system by connecting a dispersion shift optical fiber according to the invention to an optical fiber called "TRUE WAVE" as in the above-mentioned preferred embodiment, it is more preferable in practice that a wavelength division multiplex transmission system is constructed by connecting a dispersion shift optical fiber according to the invention to an optical fiber called "TRUE WAVE".

What is claimed is:

1. A optical fiber system comprising:
   a dispersion shift optical fiber connected to and for use with a positive dispersion slope optical fiber which has a positive dispersion slope and a zero dispersion wavelength band of 1500 nm to 1600 nm, wherein the mean dispersion slope of the dispersion shift optical fiber in the range of the wavelength of 1530 nm to 1560 nm is negative and the chromatic dispersion of a wavelength which is substantially coincident with the zero dispersion wavelength of said positive dispersion slope optical fiber is substantially 0 ps/nm/km.

2. An optical fiber system as defined in claim 1, wherein the zero dispersion wavelength of the positive dispersion slope optical fiber is a wavelength value which is outside the wavelength band from 1530 nm to 1560 nm and the zero dispersion wavelength of the dispersion shift optical fiber is made substantially coincident with the zero dispersion wavelength of said positive dispersion slope optical fiber.

3. An optical fiber system as defined in claim 1, wherein the mean dispersion slope in the range of wavelength from 1530 nm to 1560 nm is made smaller than −0.07 ps/nm$^2$/km.

4. An optical fiber system as defined in claim 1, wherein the relative refractive index difference of a core of the dispersion shift optical fiber is Δ1, the relative refractive index difference of the first clad covering the outer circumferential side of said core is Δ2, and the relative refractive index difference of the second clad covering the outer circumferential side of said first clad is Δ3, and wherein Δ1>Δ3>Δ2.

5. An optical fiber system as defined in claim 2, wherein the relative refractive index difference of a core of the dispersion shift optical fiber is Δ1, the relative refractive index difference of the first clad covering the outer circumferential side of said core is Δ2, and the relative refractive index difference of the second clad covering the outer circumferential side of said first clad is Δ3, and wherein Δ1>Δ3>Δ2.

6. An optical fiber system as defined in claim 3, wherein the relative refractive index difference of a core of the dispersion shift optical fiber is Δ1, the relative refractive index difference of the first clad covering the outer circumferential side of said core is Δ2, and the relative refractive index difference of the second clad covering the outer circumferential side of said first clad is Δ3, and wherein Δ1>Δ3>Δ2.

7. An optical fiber system which is capable of wavelength division multiplex optical transmissions by passing optical signals amplified by an optical amplifier, in which an erbium-doped optical fiber is used, through an optical line to which a positive dispersion slope optical fiber and dispersion shift optical fiber are connected, wherein said amplifier has a gain band substantially between 1530 nm and 1560 nm, the positive dispersion slope optical fiber has a positive dispersion slope, the zero dispersion wavelength band is from 1500 nm to 1600 nm, the dispersion shift optical fiber has a negative mean dispersion slope, the wavelength of which is from 1530 nm to 1560 nm, and the zero dispersion wavelength of which is made substantially coincident with the zero dispersion wavelength of said positive dispersion slope optical fiber, and the zero dispersion wavelength of said positive dispersion slope optical fiber and dispersion shift optical fiber is set to the wavelength which is outside the gain band of said amplifier.

8. An optical fiber system for wavelength division multiplex optical transmissions comprising: an erbium-doped optical fiber amplifier optically coupled with a positive dispersion slope optical fiber and dispersion shift optical fiber, wherein the erbium-doped optical fiber amplifier has a gain band roughly between 1530 nm and 1560 nm, the positive dispersion slope optical fiber having a positive dispersion slope, the zero dispersion wavelength band being from approximately 1500 nm to 1600 nm, the dispersion shift optical fiber having a negative mean dispersion slope, the wavelength of which is from approximately 1530 nm to 1560 nm, and the zero dispersion wavelength of which is made substantially coincident with the zero dispersion wavelength of the positive dispersion slope optical fiber, and the zero dispersion wavelength of the positive dispersion slope optical fiber and dispersion shift optical fiber being at a wavelength which is outside the gain band of the erbium-doped optical fiber amplifier.

9. An optical fiber system as defined in claim 8, wherein the relative refractive index difference of a core of the dispersion shift optical fiber is Δ1, the relative refractive index difference of the first clad covering the outer circumferential side of said core is Δ2, and the relative refractive index difference of the second clad covering the outer circumferential side of said first clad is Δ3, and wherein Δ1>Δ3>Δ2.

* * * * *

UNITED STATES PATENT AND TRADEMARK OFFICE
CERTIFICATE OF CORRECTION

PATENT NO. : 5,854,871

DATED : December 29 1998

INVENTOR(S) : Akasaka

It is certified that error appears in the above-identified patent and that said Letters Patent is hereby corrected as shown below:

Col. 4, line 47, "$\Delta\_1$" should read -- $\Delta 1$ --

Col. 4, line 52, "$\Delta\_3$" should read -- $\Delta 3$ --

Col. 5, line 29, "$\Delta\_3$" should read -- $\Delta 3$ --

Col. 6, line 3, "($\Delta\_H$" should read -- $\Delta H$ --

Signed and Sealed this

Seventeenth Day of August, 1999

Attest:

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,854,871
DATED : December 29, 1998
INVENTOR(S) : Akasaka

It is certified that error appears in the above-identified patent and that said Letters Patent is hereby corrected as shown below:

On the title page, item [73], the assignee should read: - - The Furukawa Electric Co., Ltd. - -
Tokyo, Japan Signed and Sealed this First Day of August, 2000

Attest:

Q. TODD DICKINSON

*Attesting Officer*     *Director of Patents and Trademarks*